Dec. 22, 1964    W. H. KNIPPEL ETAL    3,162,146
COMPARTMENTIZER SUSPENSION AND OPERATING ARRANGEMENT
Filed Jan. 14, 1963    7 Sheets-Sheet 1

INVENTORS
WILLIS H. KNIPPEL
WILLIAM R. SHAVER
BY
Wayne Morris Russell

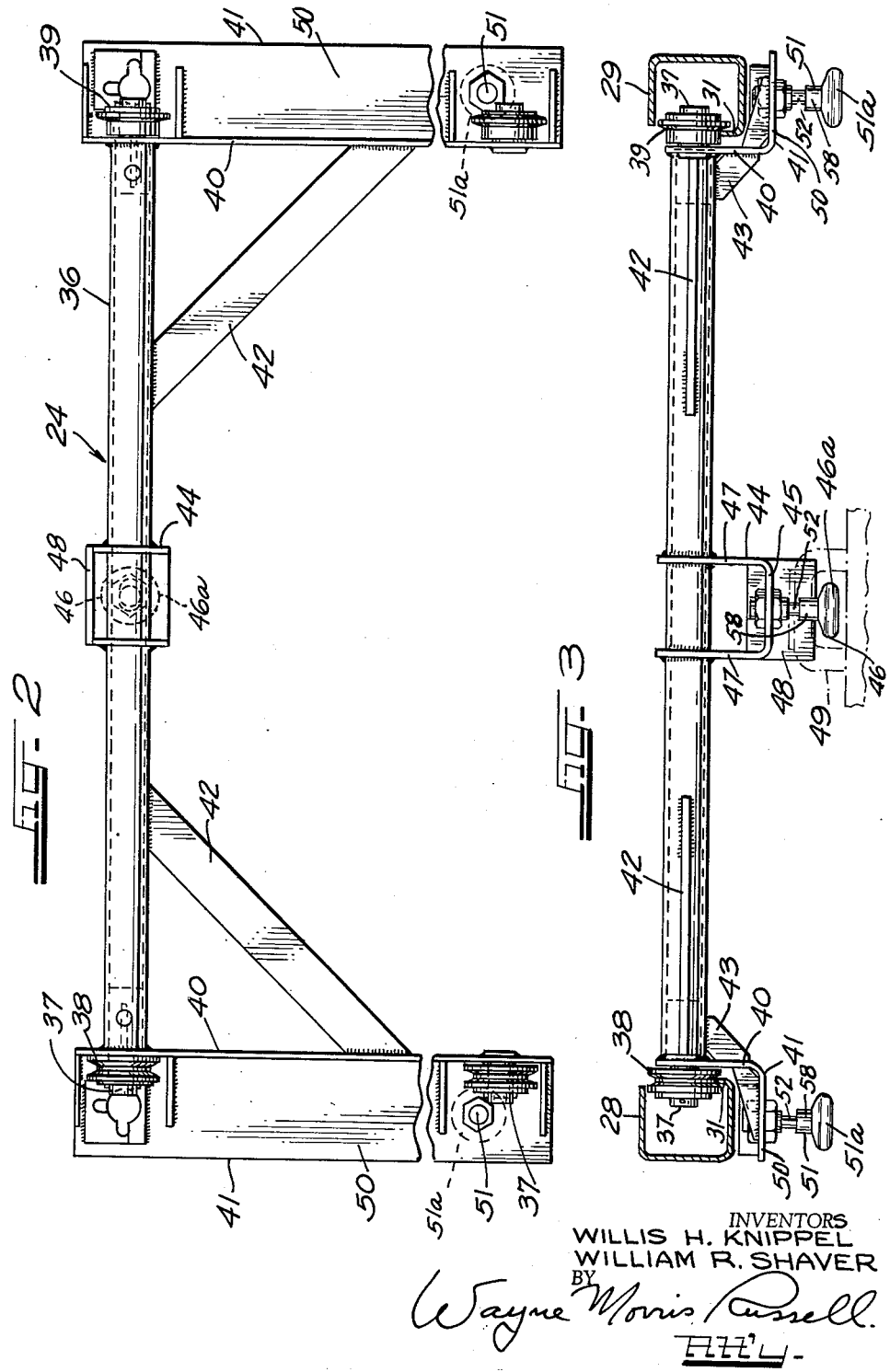

Dec. 22, 1964  W. H. KNIPPEL ETAL  3,162,146
COMPARTMENTIZER SUSPENSION AND OPERATING ARRANGEMENT
Filed Jan. 14, 1963  7 Sheets-Sheet 3
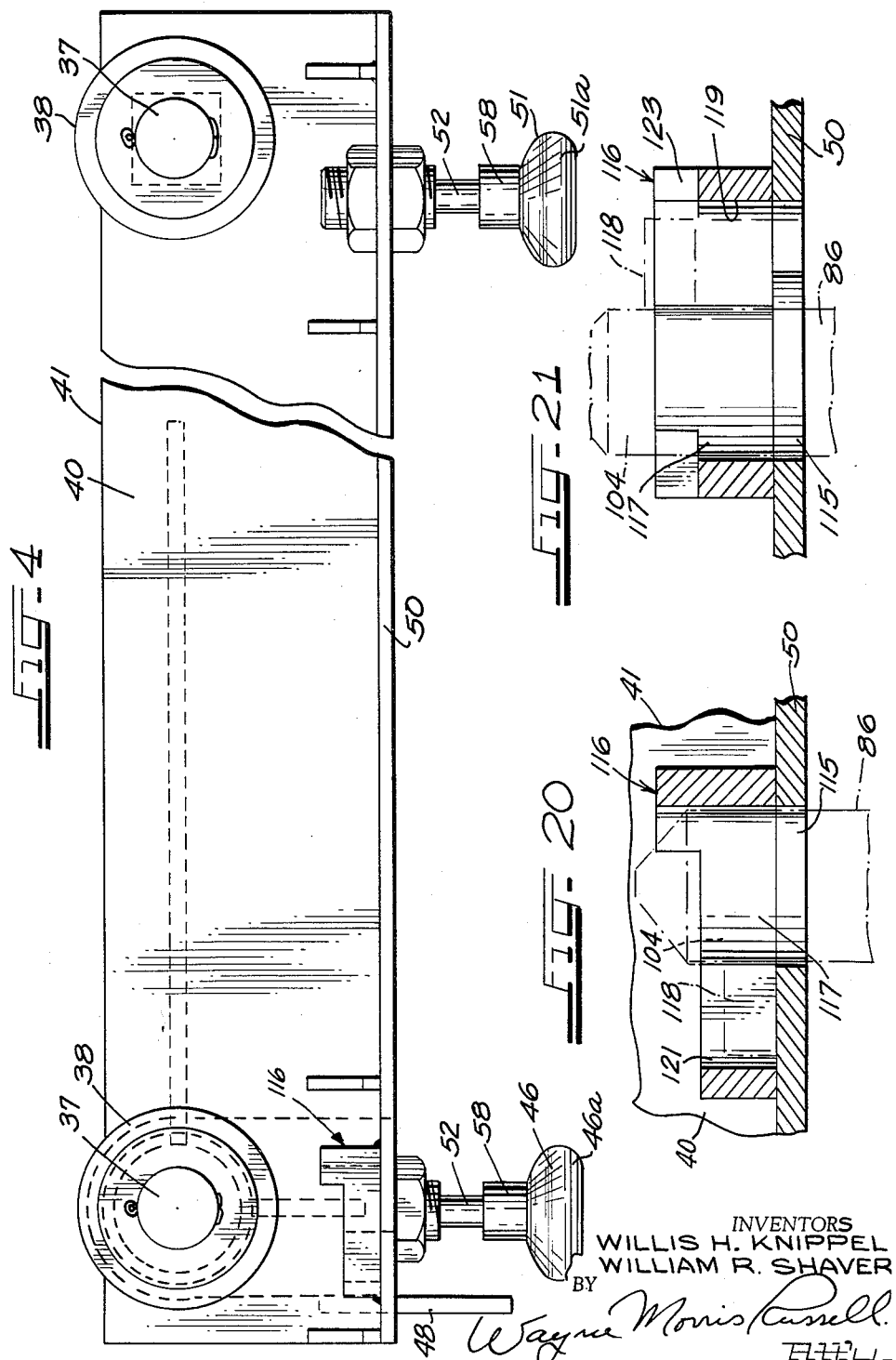
INVENTORS
WILLIS H. KNIPPEL
WILLIAM R. SHAVER
BY Wayne Morris Russell
ATTY.

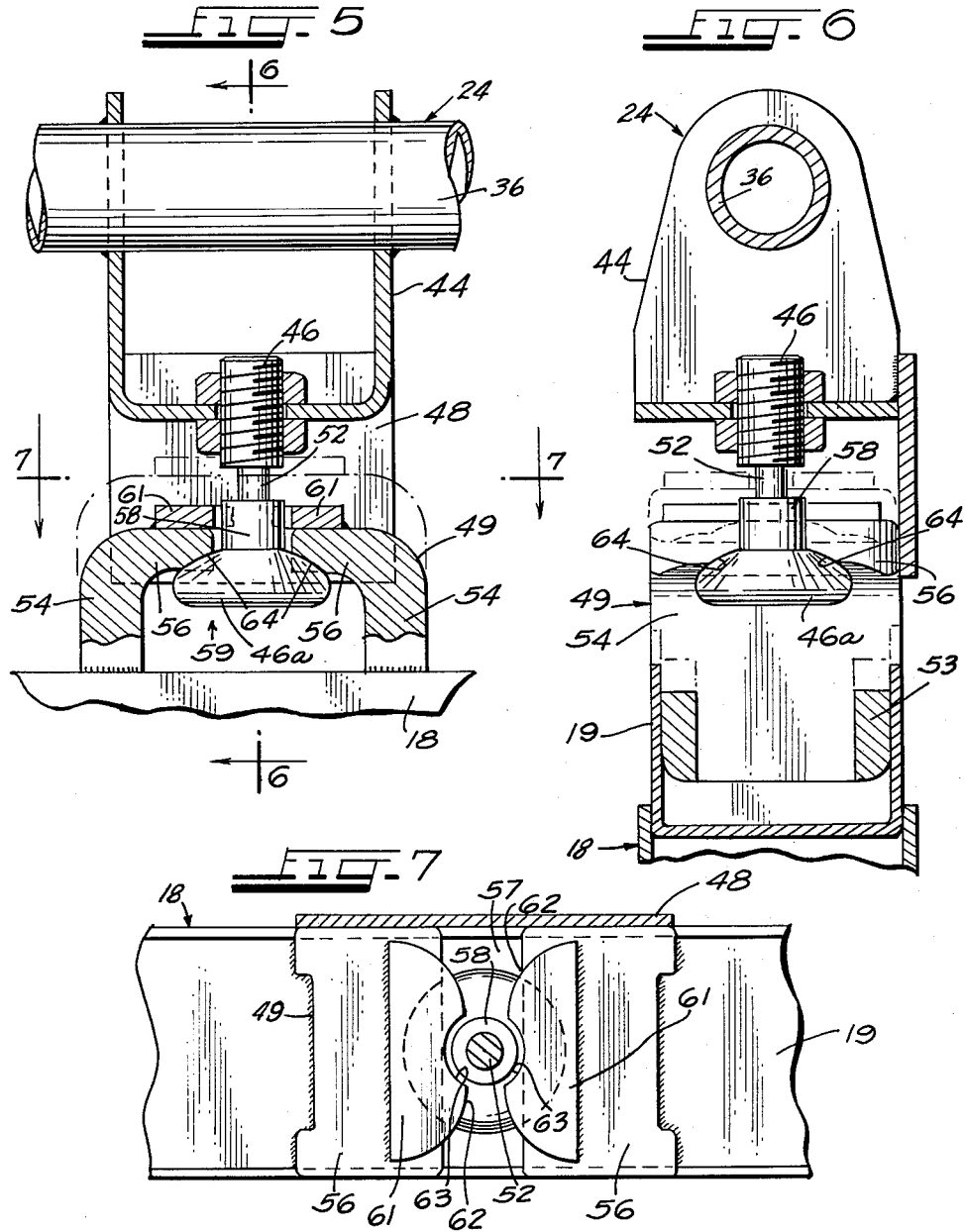

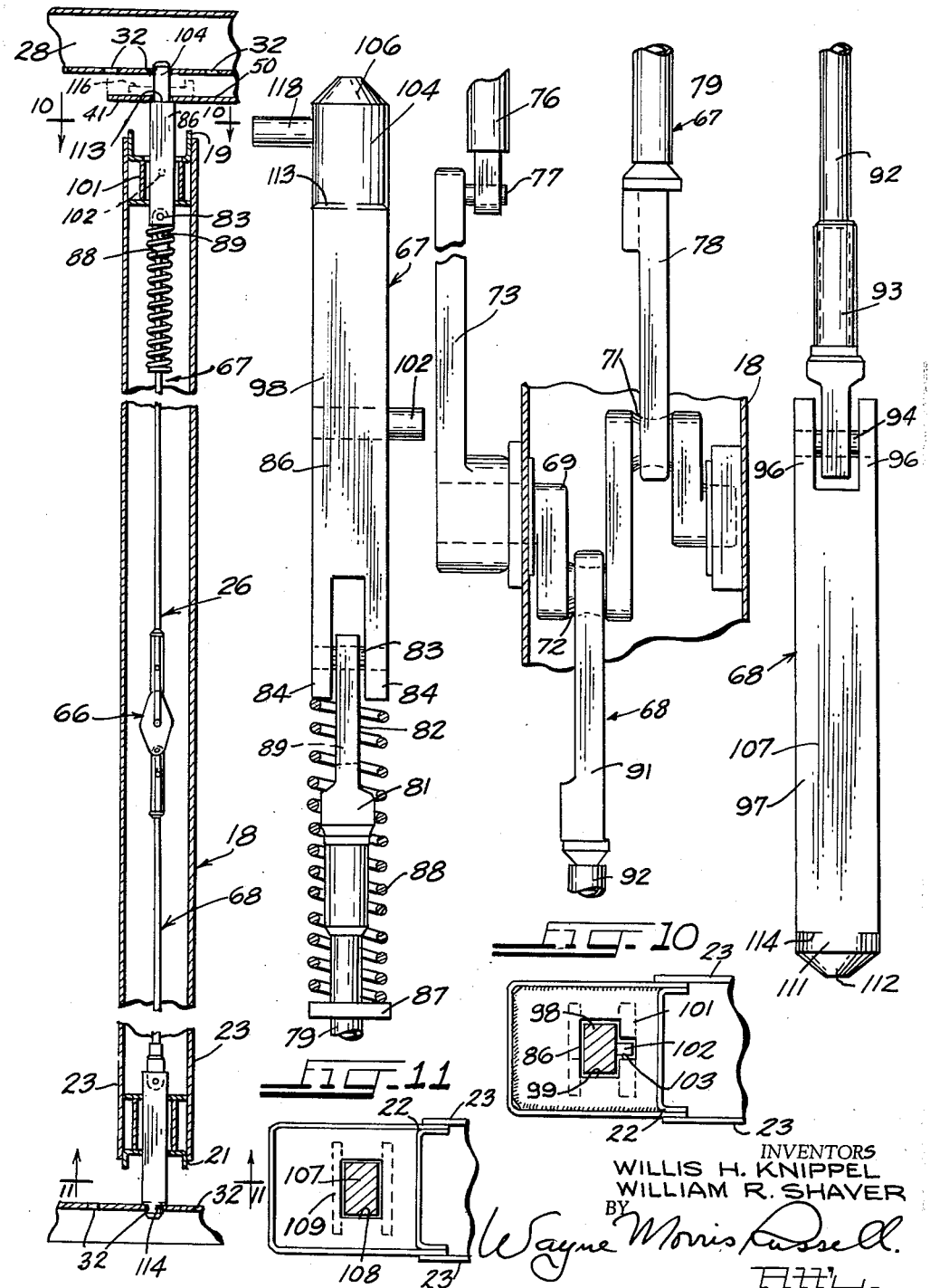

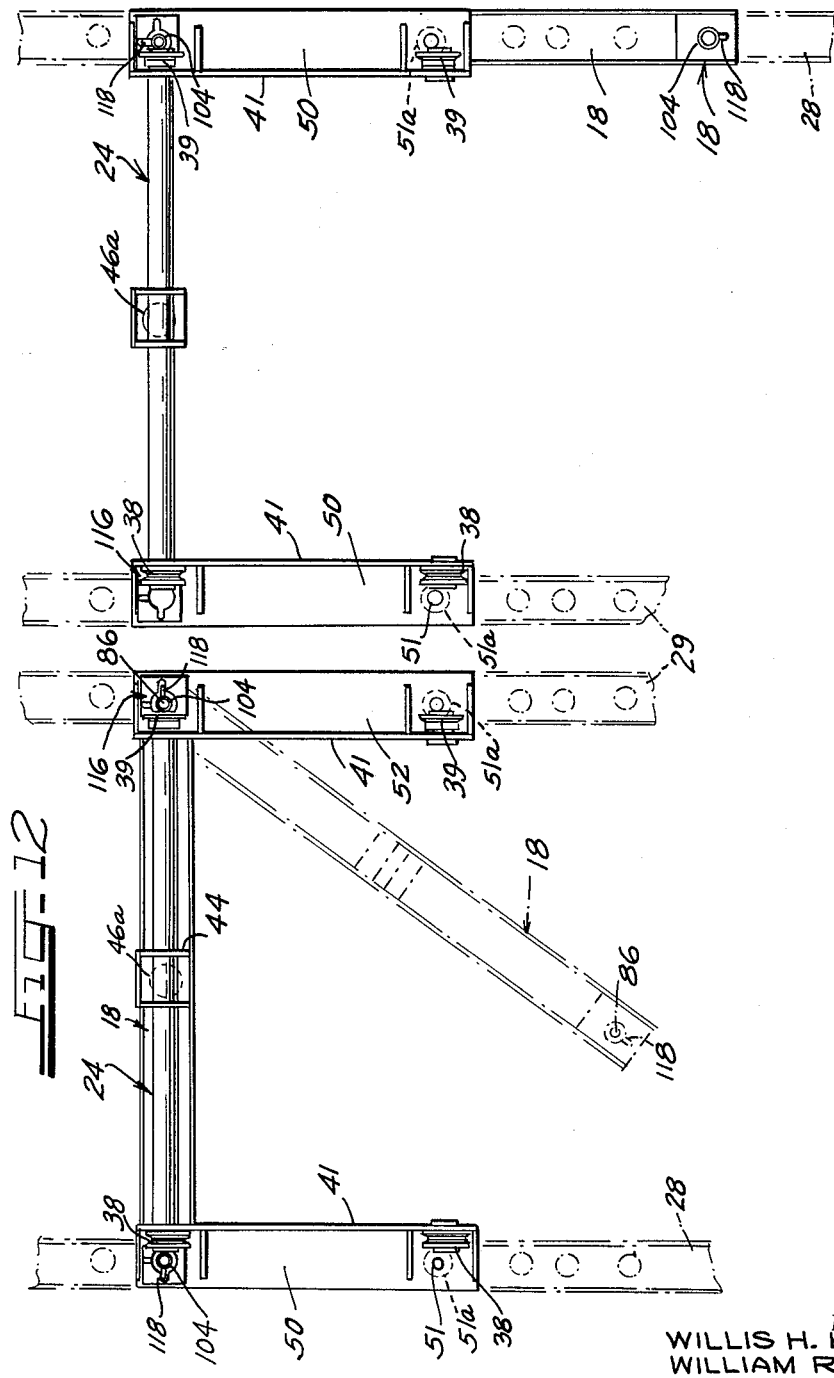

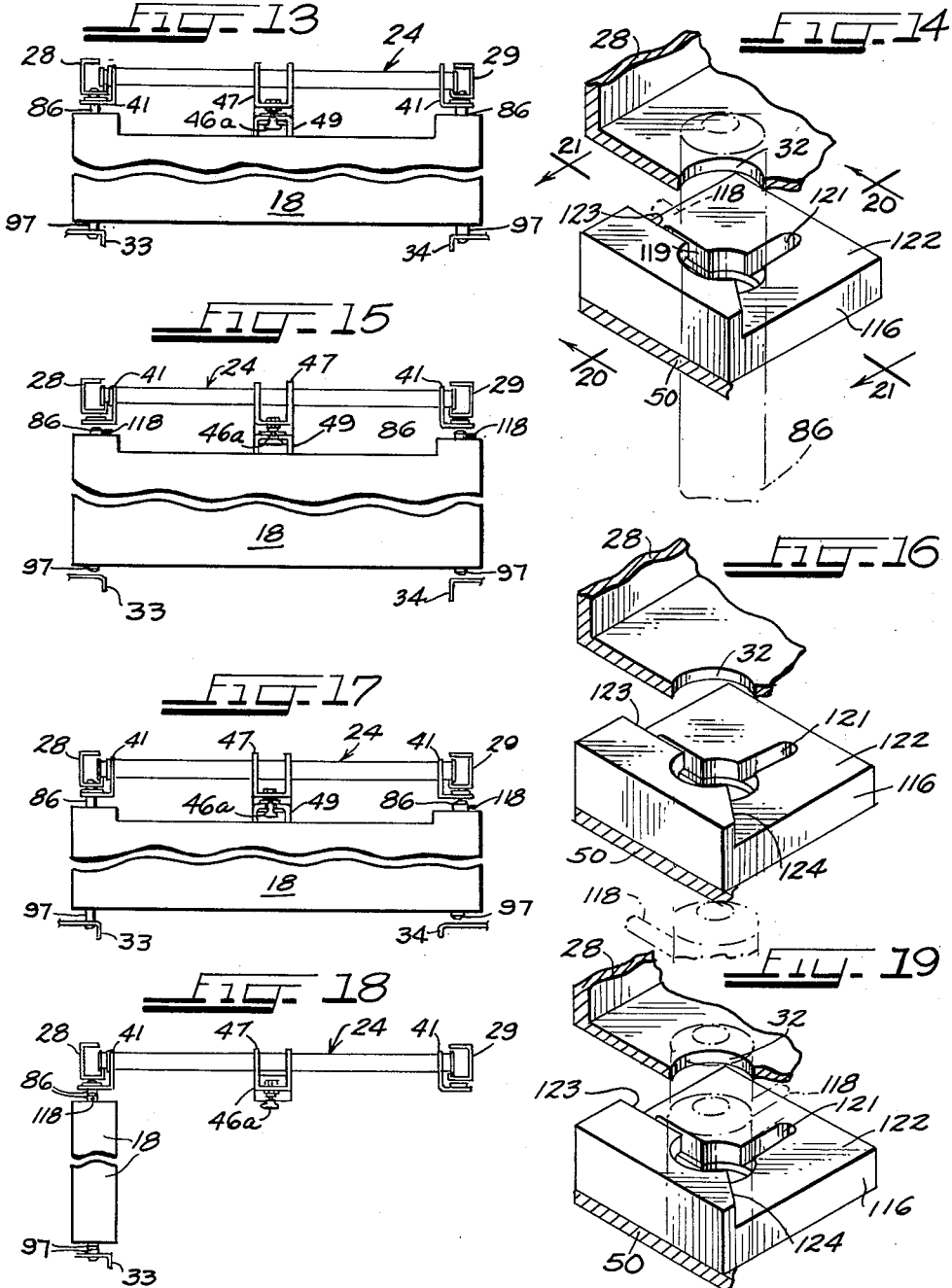

United States Patent Office 3,162,146
Patented Dec. 22, 1964

3,162,146
COMPARTMENTIZER SUSPENSION AND
OPERATING ARRANGEMENT
Willis H. Knippel, Palos Park, Ill., and William R. Shaver,
Munster, Ind., assignors to Pullman Incorporated, Chicago, Ill., a corporation of Delaware
Filed Jan. 14, 1963, Ser. No. 251,230
10 Claims. (Cl. 105—376)

The present invention relates to means for separating the lading within freight vehicles and more particularly to a new and improved lading separating means which is movable lengthwise of the vehicle in a transverse attitude to divide or partition the latter into compartments and also movable to a longitudinal attitude for storing when partitioning is not required.

It is a principal object of the present invention to provide lading separating means employing a gate for separating the lading wherein the gate is supported on a transverse support means movable lengthwise of the car to divide the same and for which the gate is suspended during longitudinal movement to a selected position and wherein the gate is detached from the transverse support to permit turning of said gate to a stored position independent of any attachment to the transverse support.

It is another object to provide a lading separating means employing a gate for separating the lading wherein the gate is detachably supported on means movable lengthwise of the vehicle so as to move the gate to a selective position and wherein there is provided means for locking the gate in the selective position which locking means are also operative to detach the gate from the support so as to facilitate the positioning of the gate to a storage position adjacent the side walls of the car independent of the movable support.

It is still another object to provide a lading separating means employing a gate for separating the lading wherein the gate is detachably supported on means movable lengthwise of the vehicle so as to move the gate to a selective position and wherein there is provided locking means for locking the gate in the selective position which locking means are also operative to detach the gate from the support and provide a pivot about which the gate may be turned independently of any attachment to the support means to a stored position.

It is still a further object to provide a lading separating arrangement employing a gate for separating the lading wherein the gate is detachably supported on means movable lengthwise of the car so as to move the gate to a selective lading separating position and wherein there is provided latching means for locking the gate in the selective position which latching means is operative to detach the gate from the support and provide a pivot about which the gate may be turned independently of any attachment to the support means to a stored position along a side wall of the car in which stored position the gate may be again suspended from the support means for movement therewith in the stored position.

A feature of the present invention is the provision of means for preventing longitudinal movement of the support means relative to the gate when the latter is detached therefrom.

Further objects and features will hereinafter appear.

In the drawings:

FIGURE 2 is a top plan view of the trolley carriage employed to render the gates movable of the car;

FIGURE 3 is a front elevational view of the trolley carriage with the gate hanger shown in phantom suspended from the center hanger bolt;

FIGURE 4 is a side elevational view of the trolley carriage;

FIGURE 5 is a fragmentary front elevational view of the trolley carriage with some of the parts being broken away and showing the center hanger bolt construction and the gate hanger suspended therefrom with the phantom lines showing the hanger position relative to the hanger bolt in the latched position of the gate;

FIGURE 6 is a cross sectional view taken substantially along the lines 6—6 of FIGURE 5;

FIGURE 7 is a cross sectional view taken substantially along the lines 7—7 of FIGURE 5;

FIGURE 8 is a cross sectional view of the latching arrangement taken generally along the lines 8—8 of FIGURE 1;

Figure 1:
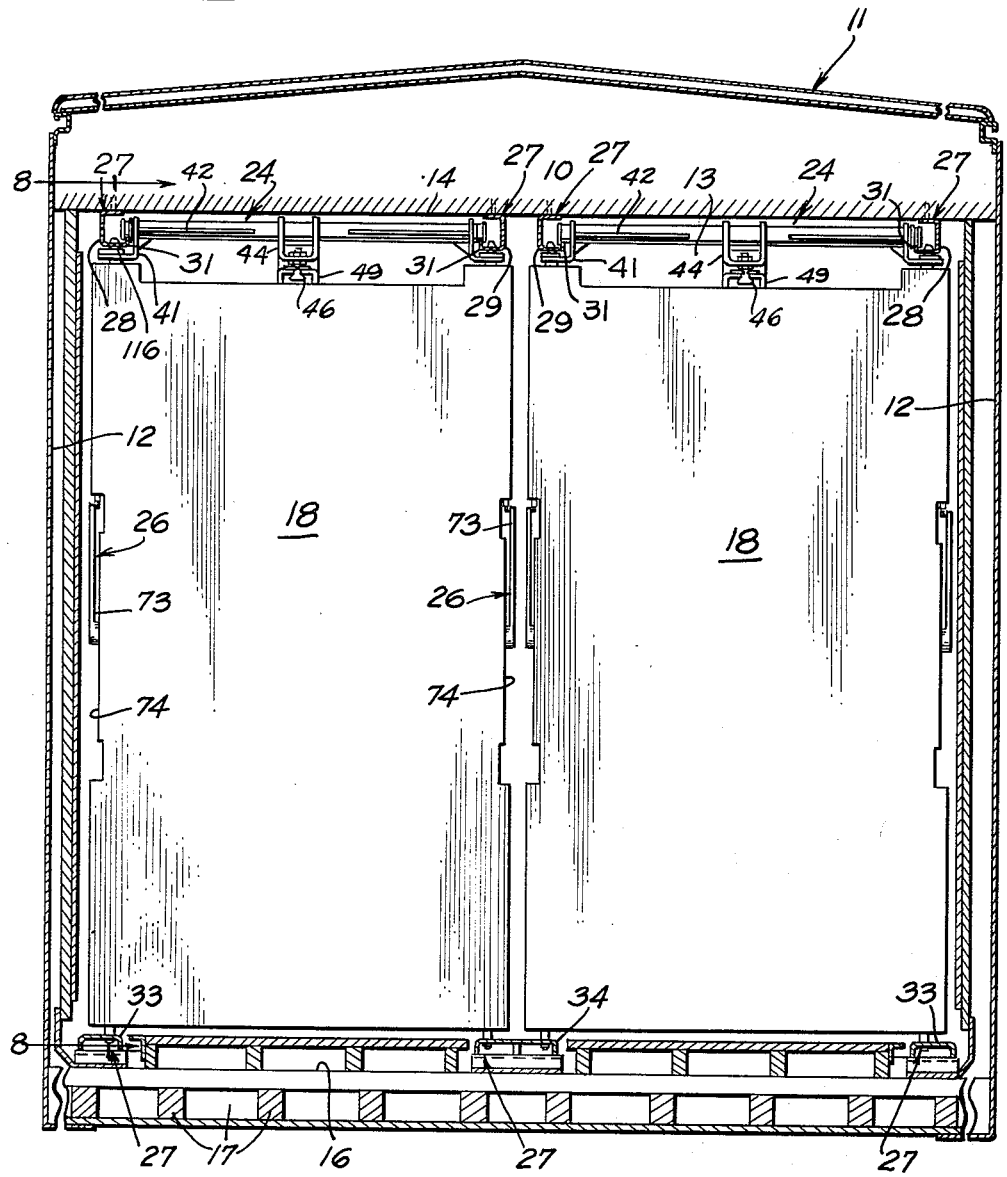
FIGURE 1 is a diagrammatic view in elevation of a railway car embodying the load dividing arrangement of the present invention.

FIGURES 9a, b and c were taken together showing a front elevational view of the latching arrangement;

FIGURE 10 is a cross sectional view taken substantially along the lines 10—10 of FIGURE 8;

FIGURE 11 is a cross sectional view taken substantially along the lines 11—11 of FIGURE 8;

FIGURE 12 is a top plan view of the gate arrangement illustrated in FIGURE 1 but showing one of the gates in a position intermediate an operative load dividing position and a position parallel to the longitudinal axis of the car and the other gate in a stored position parallel to the longitudinal axis of the car;

FIGURE 13 is a schematic illustration of the load dividing arrangement showing the relative positions of the components thereof when the gate is in a locked load dividing position;

FIGURE 14 is a perspective view of the guide block showing the relative position of the locking spud in phantom when the latching means is in the locked position shown in FIGURE 13;

FIGURE 15 is similar to FIGURE 13 but showing the relative positions of the components in the unlocked position wherein the trolley carriage and the gate suspended therefrom are movable lengthwise of the car.

FIGURE 16 is a perspective view similar to FIGURE 14 but showing in phantom lines the position of the latching spuds in the unlocked position thereof;

FIGURE 17 is a schematic view similar to FIGURES 13 and 15 but showing the relative positions of the components when employed to turn the gate between its load dividing position and its position parallel to the longitudinal axis of the car;

FIGURE 18 is a schematic view similar to FIGURES 13, 15 and 17 but showing the relative positions of the components when the gate is in a stored position adjacent a side wall of the car;

FIGURE 19 is a perspective view similar to FIGURES 14 and 16 but showing in phantom the position of the spud latching device when the gate is in the stored position illustrated in FIGURE 18;

FIGURE 20 is a cross sectional view of the guide block taken substantially along the lines 20—20 of FIGURE 14; and FIGURE 21 is a cross section view of the guide block taken substantially along the lines 21—21 of FIGURE 14.

Referring now to the figures the load separating or partitioning arrangement 10 of the present invention is illustrated embodied in a railway freight vehicle 11 which may be a conventional box car including side walls 12, end walls 13, a ceiling 14 and a floor 16 of which the latter is supported on the longitudinally extending underframe members 17 in a more or less conventional manner.

In the form shown the partitioning arrangement 10 includes generally a pair of side-by-side partitioning members 18 arranged so that when positioned transversely of the car form a wall or barrier extending between the side walls 12. The partitioning or gate members 18 are each of similar structure and are preferably of lightweight construction capable of withstanding the stresses usually associated with compartmentized types of gate construction.

In the preferred form show (FIGURES 6, 8, 10 and 11) the gate 18 employs a core stabilized construction including generally a shell form by channel members defining the top 19, bottom 21, and sides 22 of the gate. Fixed across the channel flanges are facing plates 23 secured thereto by way of welding. Disposed between the facing plates and bonded thereto is a core of honeycomb material (not shown) which may be a cardboard or resilient type of honeycomb. The honeycomb core serves to distribute the sheer flow of the bending forces applied on the surface of the face plates 23 along the respective mating and bonded surfaces and transfers these bending forces to the channel members 19, 21 and 22 such that substantially all of the sheer stress is assumed by the top, bottom and side channels 19, 21 and 22 forming the shell. For a more detailed description of the gate construction reference is made to U.S. patent application Serial No. 148,529, filed October 30, 1961, assigned to the assignee of the present invention.

The gates 18 are suspended or supported by way of the transversely extending supports or carriages 24 which are movable lengthwise of the car so as to selectively position the respective gates 18 longitudinally of the car into a load dividing position. When so positioned latching means 26 provided in the gates 18 coact with keeper means 27 fastened to the ceiling and floor of the car so as to lock the gate in its selective position.

In accordance with the present invention when it is desired to store the gates 18 along the side walls 12 or longitudinally of the car the gates 18 are detachably secured to the carriages 24 and the latching means 26 are employed as a pivot axis for swinging the gates 18 transversely of the car.

As shown the means for movably supporting the carriage is incorporated in the keeper means 27 secured to the ceiling as by bolts. The ceiling keeper means extend longitudinally of the car including one set of keepers including an inner and outer keeper 28 and 29 for each of the gates and are in the form of channels of substantially C-section. Each of the C-sections have an upwardly projecting vertical flange providing a rail 31 and the channels are arranged so that the rails 31 are in a spaced opposing relationship; one set for each of the carriages 24.

Provided in the ceiling keepers 28 and 29 are spaced openings 32 which coact with the gate latching means to hold the gates locked. The openings 32 are transversely aligned in the opposing keepers 28 and 29 of each set so that when the latching means 26 on each side of the gates 18 are disposed therein, the gates are held locked in a plane substantially transverse to the side walls 12 as shown in FIGURE 1. Secured to the floor 16 of the car are outer floor keepers 33 and an intermediate keeper 34. The outer floor keepers 33 are located directly below and in alignment with the outer ceiling keepers 28 and includes openings 32 aligned with the openings 32 of the ceiling keepers. The intermediate keeper 34 as shown is formed as a single unit includes two rows of openings 32 in alignment with the respective openings 33 in each of the two inner ceiling keepers 29.

The trolley carriage 24 supporting the gates 18 are each of identical structure so that only one is hereinafter described, it being understood that the other carriage is of identical structure. The trolley carriage 24 (FIGURES 2, 3 and 4) includes a transversely extending hollow shaft 36 which extends between the outer and inner ceiling keepers 28 and 29. Rotatably supported on stub shafts 37 fixedly secured to the ends of the shaft 36 and rideable on the rails are roller members 38 and 39. One of the roller members 38 may be of the dual flange type and the other roller 39 of a single flange type. With this arrangement of the dual and single flanged wheel the assembly of the carriage to the rail structure as shown is facilitated.

Fixed to the ends of the hollow shaft are vertical webs 40 of angle members 41 extending longitudinally of the car and parallel to the floor. The angle members 41 carry at the ends thereof stub shafts 37 on which there are turnably mounted flanged wheels 38 and 39 identical to the wheels or roller supported on the respective ends of the hollow shaft 36. Extending between the hollow shaft 36 and angle members 41 are horizontal bracing members 42 for reinforcing the latter. Reinforcing may also be provided by way of gusset plates 43 at the juncture of the vertical leg 40 with the hollow shaft 36.

Disposed intermediate the ends of the hollow shaft 36 and fixed thereto as by welding is a substantially U-shaped hanger bracket 44 to the bight portion 45 of which there is threaded a downwardly depending hanger bolt 46 which detachably supports the gate 18 as more fully to be explained hereinafter. Extending across the bracket legs 47 and fixed to the bight 45 is a downwardly depending plate or stop 48 which coacts with the hanger 49 fixed to the top channel of the gate 18.

Side hanger bolts 51 are similarly fastened to the horizontal webs 50 of the angle members 41 adjacent to the free ends thereof. In this connection it is to be noted that the horizontal webs 50 are arranged to lie in substantially the same plane as the bight 45 of the U-shaped bracket 44 and the heads 51a of the hanger bolts 51 affixed thereto are all on the same level as the head 46a of the primary hanger bolts 46. Moreover the side hanger bolts 51 on the horizontal webs 50 are located so that when the gate 18 is detached from its suspending engagement with the hanger bolt 46 on the hollow shaft 36 and turned to a position parallel to the longitudinal axis of the car, the gate may then be suspended from either of the side hanger bolts 51. The hanger bolts 46 and 51 are each formed with a reduced shank portion 52 intermediate the threaded ends and the bolt heads.

Fixed to the upper or top channel 19 of the gate 18 is the gate hanger 49 which may be formed from a casting or the like. The hanger 49 as shown (FIGURES 5, 6 and 7) includes a rectangular base portion 53 which may have an opening in the center thereof. Extending upwardly from the two opposing sides of the base 53 are upright arms 54 from the upper ends of which there extend inwardly projecting horizontal arms 56. The free ends of the horizontal arms 56 are spaced so as to provide an open-ended slot 57 for loosely accommodating the shank 58 of the hanger bolts 46 and 51. The upright arms 54 and the horizontal arms 56 as shown define an open-ended hanger head accommodating chamber 59 which is adequate to permit elevation of the gate 18 from suspending engagement with the hanger bolt heads 46a and 51a for reasons which will be readily apparent hereinafter. Fixed on the upper side of each of the hanger arms 56 are end spaced slot-constricting plates 61. The slot-constricting plates are fixed along the adjacent edges thereof so as to provide a narrow slot 62 at the forward and rear ends thereof capable of accommodating only the reduced shank portion 52 of the hanger bolts 46 and 51. The center portion of the constricting plates are formed with cutouts 63 so as to freely accommodate the reduced shank portion 52 and also accommodate the shank 58 as clearly shown in FIGURE 7.

The inner wall of the horizontal arms 56 are formed with indentations 64 for nestingly contacting or engaging the hanger heads 46a and 51a about the shank 58. In order to permit rocking movement of the gate to facilitate the alignment of the latching means 26 with the upper and lower keeper openings 32, the nesting indentations 64 are preferably limited to engagement with only the upper portion of the heads 46a and 51a. To this end, the area adjacent the nesting indentation may be cut away as shown so as to preclude contact with the sides of the head. Fixed to and projecting downwardly from the hanger bolt bracket 44 as above described is the vertical stop member 48 which projects across the rear end of the open-ended slot 57 so that the gate may be detached from the hanger bolt only in the direction of the transverse hanger bolts 51.

As shown in particular in FIGURES 8, 9a, 9b and 9c the latching means 26 are disposed in an enclosure on opposite sides of the gate and each including generally a latch actuating mechanism 66, an upper spud latching assembly 67 and a lower spud latching assembly 68. The latch actuating mechanism (FIGURE 9b) includes a crank shaft 69 journaled at one of its ends in the vertical web of the side channel members and at its other end in an enclosure plate fixed across the horizontal webs of the side channel members 18. Turnably connected to one of the crank arms 71 is the upper spud assembly 67 and to the other crank arm 72 there is connected the lower spud assembly 68.

The crank shaft 69 is turned by way of a handle 73 connected to the crank shaft 69 for turning movement therewith. As shown the handle 73 is disposed within a cutout portion 74 provided along the edge of side channels 22. The handle 74 may be formed from a casting or sheet metal. For holding the handle 74 in the locked or latched position there is provided a spring-depressed plunger 76 having a forked end which engages an inwardly projecting pin 77 fixed to the end of the handle as shown in FIGURE 9a.

The upper spud latching assembly 67 includes a connecting rod member 78 turnably connected to the crank shaft arm 71 at one end and at its other end force-fitted into one end of a tubular rod 79. Fixed to the other end of the tubular rod 79 is a spud connecting member 81 having an elongated slotted end 82 which receives a pin 83 supported by the clevis arms 84 provided on the lower end of the upper latching spud 86. Disposed between the bottom of the upper spud and a washer 87 fixed to the rod 79 is a biasing spring 88 which serves to urge the locking spud upwardly in the slot 89 of the connecting member 81.

The lower spud latching assembly 68 includes a connecting member 91 having one end turnably supported on the crank shaft arm 72 and its other end fixed to a tubular rod 92. Fixed in the other end of the tubular rod 92 is a connecting member 93 which is turnably connected to a pin 94 mounted in clevis arms 96 formed on the upper end of the lower latching spud 97.

The upper latching spud 67 (FIG. 10) is of substantially rectangular section at its lower end 98 and is guided for vertical movement in a rectangular opening 99 provided by spud guiding means 101 fastened in the side channel 22. Projecting from the rectangular section 98 is a pin 102 which is slidably disposed within a vertical slot 103 formed along one side of the rectangular guide 101. The pin and slot arrangement 102 and 103 serve along with the rectangular guide opening 99 to preclude rotation or turning of the gate 18 and the latching means 26 relative to each other. The upper end 104 of the locking spud is formed with a substantially circular section and a tapered head 106 which are receivable within the upper keeper openings 32.

The lower latching spud is also formed with a portion 107 of substantially rectangular section which portion is movable in a rectangular opening 108 of a guide member 109 fastened to the lower end of the side channels. The lower end 111 of the spud is formed of circular section with a tapered head 112 which is receivable within the lower or floor keeper openings 32.

In the normal locked position shown in FIGURE 8 the latching spuds 86 and 97 are engaged in vertically aligned openings 32 of the upper and lower keepers 28 and 33 respectively. To assume the locked position the handle 73 is moved from a normal substantially horizontal position employed to position the gate 18 lengthwise of the car to its upwardly extending position. In the locked position of the handle 73 the crank shaft 69 fixed for turning movement with the handle 73 is turned so that the upper spuds 86 and lower spuds 97 are engaged within the keeper openings 32 with shoulders 113 and 114 of the respective rectangular end portions 98 and 107 abutting the underside of the horizontal flanges 50 of the carriage angles 41 and the keepers 33 and 34 respectively. In this manner the overall length of the lower latching spud assembly connected to the crank arm 72 is such that the gate 18 is moved upwardly. Such upward movement is made possible by the pin slot connection 82 of the upper spud 86 with the upper spud linkage 79 and 81 and the biasing spring 88 which retains the upper spud engaged in the keeper openings.

When the gate 18 is thus moved upwardly the hanger 49 affixed thereto is correspondingly moved so that the latter is no longer in nesting engagement with or suspended from the hanger bolt head 46a as shown in the phantom line position of FIGURE 6. In this connection it should be mentioned that the gate 18 is elevated and detached from suspension with the hanger bolt heads 46a or 51a when either or both of the latching devices is in a latched or gate locked position in the position shown in FIGURE 1.

In the event that both latching devices 26 are in the unlocked position as shown schematically in FIGURE 15 the gate drops downwardly and is suspended by way of the hanger 49 from the hanger bolt head 46. In this hanger bolt suspended position the slot constricting means 61 lie in the plane of the enlarged shank 58 such that the turning movement of the hanger through the hanger arm slot 57 is prevented by the constricted slots 62 of the constricting plates 61. In this manner the constricting plates 61 are operative to preclude detachment of the gate when the latter is suspended from the hanger bolt head 46a.

It is to be noted that the release position of the latching means 26, the upper and lower spuds 104 and 111 are both completely disengaged from their keepers. Thus, the gate 18 is free to be turned around or rocked about the hanger bolt 46 of which the head 46a is nestingly engaged within the indentations 64.

While the latch handles 73 along the sides of the car may be employed to move the latter lengthwise of the car by rolling the carriage along the tracks, it is to be understood that a separate handle or handles fixedly and immovably fastened to the side plates 23 may also be employed. In accordance with the present invention wherein the handle is connected to the crank shaft 69 to which the upper and lower spud linkages are connected it is possible to turn the handle from its upright locked position away from either face of the gate to disengage the locking spuds. This is advantageous since under some circumstances where turning of the gate 18 about the hanger 48 may be required the handle position may be changed to be readily accessible from either side of the gate for moving the gate lengthwise of the car. When the gate has been selectively turned to its desired position the latching means 26 are moved to their locked position to firmly hold the gate 18 locked as previously described above.

As shown in FIGURES 17 and 18 detachment of the gate 18 from the hanger bolt 46 by way of one of the latch devices 26 being in a locked position while the other is in an unlocked position permits rotation of the gate 18 from its normal position transversely of the car axis to a position parallel to the longitudinal axis. Since the pivotal movement may be about either of the latching spuds the gate may be moved to a stored position adjacent the side or be positioned in alignment with and parallel to the inner keepers along the center of the car as shown in FIGURE 12. Rotation of the gate 18 is made possible by the circular spud ends of the upper and lower spuds inserted in the upper and lower keeper openings 32 which turnably support the latching means 26 so that the latter serves as a pintle. As heretofore described the upper and lower spuds 86 and 97 each include a rectilinear section 98 and 107 respectively and the upper spuds each also include the pin-slot arrangement 102–103 preventing relative turning of the gate and latching means so that as the latching device 26 is rotated within the keeper openings 32 the gate 18 simultaneously rotates therewith.

Rotation of the gate 18 to a position parallel to the longitudinal axis of the car results in the hanger bolts 51 fixed to the longitudinally extending angle members 41 entering the hanger slot 57 of the hanger 49 as the latter aligns therewith. The side hanger bolts 51 are formed similarly to the carriage hanger bolts 46 with a reduced shank portion 52 and an enlarged shank portion 58. These shank portions are arranged so as to align with the hanger 57 and constricting slots 62. Until the latching means is released from its latched position the side hanger bolt head 51a is spaced from the underside of the horizontal arms 56 so that the gate 18 is not suspended from the longitudinal angle member 41. However, when the locked latching means 26 is released the gate 18 and thereby the hanger 49 fixed thereto is lowered so that the hanger head 51a nests within the indentations 64 on the underside of the horizontal arms 56. In this manner the gate 18 is again suspended from the carriage 24 along one of the longitudinally extending angle members 41. With the gate thus suspended from the carriage and both latching devices released the gate is free to be moved lengthwise of the car to a desired position wherein it may be locked in a position parallel to the longitudinal axis of the car.

As shown in FIGURES 14, 16, 19, 20 and 21, to prevent relative longitudinal movement of the carriage 24 and gate 18 during rotation of the latter between its positions transversely of and parallel to the longitudinal axis of the car the horizontal webs 50 of the longitudinal angle members 41 are located in the path of movement of the latching devices 26 to their locked position and are formed with an opening 115 accommodating the circular ends 104 of the upper spuds 86. Fixed to the upper face of the horizontal webs 50 are pivot blocks 116 having openings 117 substantially axially aligned with the horizontal web openings 115 and also accommodating the circular end of the spud 86 which is projectable therethrough for engagement within the keeper openings 32. Radially projecting from the circular spud section 104 is a locating pin 118 which is arranged so as to coact with a transversely extending slot 119 and a longitudinally extending slot 121 communicating with the spud openings 115 and 117. The transversely extending slot 119 is formed through the horizontal web 50 while the longitudinally extending slot 121 terminates at its lower end at the horizontal web 50. In the gate suspended position transversely of the car as shown in FIGURES 15 and 16 wherein the latching means 26 are in released position the spuds 86 each lie beneath the horizontal web 50 so that gate 18 is free to be rotated about the hanger bolt 46. Upon raising the gate as by moving the latching means 26 to their latched position the locating pins 118 passing through the transverse slots 119 serve to position and locate the gate 18 transversely to the side walls 12 of the car. In the fully latched or locked position as shown in FIGURES 13 and 14 the locating pins 118 lie above the top surface 122 of the guiding blocks 116.

When it is desired to turn the gate 18 from its transverse load dividing position as heretofore described wherein one of the latching devices 26 is in a released position and the other is in a latched position the locating pin 118 of the upper latched spud 86 is positioned above the surface 122 so that the locked latching device 26 and gate are conjointly free to turn as shown in FIGURE 14. Such turning is limited in a direction toward the side hanger bolts 51 fixed to the longitudinally extending angle members 41 of the carriage 24 by way of a shoulder 123 formed on the pivot guide block 116. The gate 18 is turned until the locating pin 118 on the latching spud 86 is in alignment with the longitudinally extending slot 121. In this position release of the locked latching device results in the locating pin 118 passing through the longitudinal slot 121 until it engages the horizontal web 50 as shown in FIGURE 20. In this manner the upper and lower latching spuds 86 and 97 are released from engagement with the keeper openings 32 while at the same time the upper spud 86 of the latching means 26 providing the pivot is retained within the pivot block 116 so as to preclude longitudinal movement of the gate 18 with respect to the carriage. This arrangement facilitates the shifting or moving of the now longitudinally extending gate lengthwise of the car when both of the latching devices are in the unlocked position.

In the event that it is desired to hold the gate 18 stationary along the side wall in its stored position as shown in FIGURE 18 the latch devices 24 are moved to their locked position shown such that the spuds are engaged with the respective upper and lower keeper openings.

As shown the guide block 116 is formed with a second shoulder 124 located so as to permit relative turning of the spud 86 beyond the longitudinally extending slot 121 before the locating pin 118 abuts the shoulder. Thus if the gate is located adjacent the door and it is desired to swing it outwardly of the car through the door one of the latching devices 26 is released and the other locked as explained heretofore in connection with the moving of the gate between its transverse and longitudinal positions. Thus the locating pin 118 on the locked upper spud 86 is elevated upwardly above the top surface 122 of the guide block 116 whereupon the latching device 26 serves again as a pintle and the gate is swung outwardly of the car door; such swinging movement of course being limited by abutment of the locating pin 118 with the stop 124.

What is claimed is:

1. In a freight vehicle having a floor, a ceiling, and opposing sidewalls, means for dividing said vehicle into compartments comprising rectangular gate means, longitudinally extending track means mounted on said ceiling, transversely extending means supported on said trackways for movement thereon, means on said transversely extending means for suspending said gate therefrom so as to be longitudinally movable therewith, gate locating means on said floor and ceiling, and at least one latching means on said gate along at least one side thereof coacting with said locating means for locking said gate in a selective position lengthwise of said car, said latching means including means coacting with said transversely extending means to maintain said gate means disposed transversely of said car in the selective longitudinal position thereof, and further means for separably detaching said gate from said suspending means when said latching means is in a locked position and while so detached said gate being pivotal about said at least one latching means to a position longitudinally of said car.

2. In a freight vehicle having a floor, a ceiling, and opposing side walls, means for dividing said vehicle into compartments comprising rectangular gate means, longitudinally extending track means mounted on said ceiling, transversely extending means supported on said trackways for movement thereon, means on said transversely extending means intermediate the ends thereof for suspending said gate therefrom so as to be longitudinally movable therewith, gate locating means on said floor and ceiling, and latch means on said gate along at least one side thereof, coacting with said locating means for locking said gate in a selective position lengthwise of said car, said latching means and said transversely extending means including means coacting to maintain said gate means disposed transversely of said car in the selective longitudinal position thereof, and means to elevate said gate for separably detaching said gate from said suspending means when said latching means is in a locked position and while so separably detached said gate being pivotal about said at least one latching means to a position extending longitudinally of said vehicle, and means for preventing longitudinal movement of said transversely extending means relative to said locked gate.

3. In a freight vehicle having a floor, a ceiling, and opposing side walls, means for dividing said vehicle into compartments comprising gate means, carriage means movably mounted on said ceiling for lengthwise movement of said car, gate support means fixedly secured on said carriage means for supporting said gate in a position transversely of said side walls and in a position parallel to said side walls, a pair of latching means along the respective sides of said gate means and being movable between a release position and a latched position coacting with keeper means on said floor and ceiling to lock said gate in a selective location lengthwise of said car in said locked position of said latching means, said latching means including means for elevating said gate means and when so elevated for separably detaching said gate from said carriage means in the locked position thereof so that one of said latch means in the locked position thereof serves as a pintle for turning said gate means between said transverse and parallel positions when the other of said latch means is released.

4. In a freight vehicle having a floor, a ceiling, and opposing side walls, means for dividing said vehicle into compartments comprising gate means, carriage means movably mounted on said ceiling for lengthwise movement of said car, gate support means on said carriage means for supporting said gate in a position transversely of said side walls and in a position parallel to said side walls, a pair of latching means along the sides of said gate means, said latching means each being movable between a release position and a locked position coacting with keeper means on said floor and ceiling to lock said gate in a selective location lengthwise of said car in said locked position of said latching means, said latching means being independently operable and each including means for separably detaching said gate from said carriage means in the locked position thereof so that one of said latch means in the locked position thereof serves as a pintle for turning said gate means between said transverse and parallel positions when the other of said latch means is released.

5. In a freight vehicle having spaced opposing side walls, a floor and a ceiling, a load dividing means comprising transversely spaced trackways mounted adjacent said ceiling and extending lengthwise of said vehicle, transversely extending carriage means movably supported on said trackways, gate suspending means fixedly secured to and depending from said carriage means, hanger means on said gate for detachably and separably suspending said gate from said suspending means, a pair of latch means along the respective sides of said gate means, keeper means on said car for coacting with said latch means, said latch means each being independently movable between a released position and a locked position in said keeper, and said latch means including means operative when one of said latch means is in said locked position and said other latch means is in said released position to coact with said keeper means and said gate to elevate said gate and detach and separate said hanger means from said gate suspending means so that said locked latch means provides a pintle about which said gate may be turned.

6. The invention as defined in claim 5 wherein said carriage means includes longitudinally extending gate supporting means disposed adjacent a side wall of said car and located so that said hanger means is detachably engageable therewith.

7. The invention as defined in claim 5 wherein said carriage includes means coacting with said latch means in the locked position thereof for preventing relative longitudinal movement of said carriage and gate means when the latter is detached therefrom.

8. The invention as defined in claim 5 wherein said carriage means includes longitudinally extending gate supporting means disposed adjacent a side wall of said car and located so that said hanger means is detachably engageable therewith, and said longitudinally extending gate supporting means includes means coacting with said latch means in the locked position thereof for preventing relative longitudinally movement of said carriage when the latter is detached therefrom.

9. The invention as defined in claim 7 wherein said latch means and said coacting means for preventing relative longitudinal movement between said gate and carriage means includes means for limiting the turning movement of said gate about said locked latching means.

10. In a freight vehicle, a load dividing means comprising carriage means movable lengthwise of said vehicle gate means, means for detachably suspending said gate means so that said gate is movable with said carriage means when suspended therefrom, a plurality of latch means, said latch means each being independently actuated and being movable between a release and locked position so as to be operative when each is in release position to maintain said gate means suspended from said carriage means for movement therewith and when each is in a locked position to elevate and detach said gate from suspension from said carriage means and lock the gate against movement, said latching means including means providing a pivot axis for said gate so that when one of said latching means is in a locked position and the other of said latching means are in a release position said gate is detached and separated from suspension with said carriage means so that said gate is turnable about said latching means between positions transverse and parallel to the longitudinal axis of said vehicle.

References Cited in the file of this patent
UNITED STATES PATENTS
3,018,741   Loomis et al. _____ Jan. 30, 1962
3,073,261   Oglesby _____ Jan. 15, 1963